US012663769B2

(12) United States Patent
Agrawal et al.

(10) Patent No.: US 12,663,769 B2
(45) Date of Patent: Jun. 23, 2026

(54) INTUITIVE POINT AND WIRING CHECKOUT OF A BUILDING MANAGEMENT SYSTEM USING A MOBILE DEVICE

(71) Applicant: Honeywell International Inc., Charlotte, NC (US)

(72) Inventors: Mudit Agrawal, Bangalore (IN); Juan-Martin Picardi, Charlotte, NC (US); Nagasree Poluri, Bangalore (IN); Prabhat Ranjan, Bangalore (IN); Deenadayalan Karunakaran, Bangalore (IN); Gil Orenstein, Atlanta, GA (US); Marco Nostrini, Milan (IT); Barnali Chetia, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 441 days.

(21) Appl. No.: 18/104,565

(22) Filed: Feb. 1, 2023

(65) Prior Publication Data

US 2024/0255903 A1     Aug. 1, 2024

(51) Int. Cl.
| | |
|---|---|
| *G05B 15/02* | (2006.01) |
| *G06F 3/04817* | (2022.01) |
| *G06F 3/0482* | (2013.01) |
| *G06F 3/04847* | (2022.01) |

(52) U.S. Cl.
CPC ......... *G05B 15/02* (2013.01); *G06F 3/04817* (2013.01); *G06F 3/0482* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 10,271,462 | B1 * | 4/2019 | Ross | H05K 7/20827 |
| 10,528,020 | B2 * | 1/2020 | Drees | G06F 3/048 |
| 10,592,084 | B2 | 3/2020 | Zummo et al. | |
| 10,594,555 | B2 | 3/2020 | McNab et al. | |
| 11,237,534 | B2 * | 2/2022 | Poluri | G06T 19/006 |
| 12,273,335 | B2 * | 4/2025 | Gupta | G06K 7/1417 |
| 2017/0373875 | A1 * | 12/2017 | Kolasa | G06F 13/4221 |
| 2018/0012173 | A1 * | 1/2018 | Leen | G05B 15/02 |
| 2018/0143601 | A1 * | 5/2018 | Chavan | G05B 15/02 |
| 2018/0164993 | A1 * | 6/2018 | Zummo | G06Q 10/00 |
| 2018/0176084 | A1 * | 6/2018 | McNab | H04L 67/10 |
| 2018/0195749 | A1 * | 7/2018 | Sinha | F24F 11/30 |
| 2019/0257568 | A1 * | 8/2019 | Buda | F25D 21/06 |
| 2020/0243203 | A1 * | 7/2020 | Reddy | G08B 25/10 |
| 2021/0088994 | A1 * | 3/2021 | Prabhakar | G05B 19/0425 |

(Continued)

*Primary Examiner* — Hua Lu

(74) *Attorney, Agent, or Firm* — Seager, Tufte & Wickhem, LLP

(57) ABSTRACT

A mobile device running an application may be used to perform a checkout on a BMS system. The mobile device may be used to obtain configuration information for the BMS system from a remote device, the configuration information including an association of points with particular I/O terminals of BMS controllers of the BMS system. The mobile device may be used install the configuration information on the BMS controllers, and perform a point and wiring checkout of the various BMS controllers before the control logic for the BMS controllers has been fully defined and made available.

20 Claims, 21 Drawing Sheets

(56) References Cited

U.S. PATENT DOCUMENTS

| | | | |
|---|---|---|---|
| 2021/0199330 A1* | 7/2021 | Noboa | F24F 11/30 |
| 2021/0231340 A1* | 7/2021 | Nystrom | G06F 16/2282 |
| 2021/0247094 A1* | 8/2021 | Joshi | F24F 11/64 |
| 2021/0397149 A1* | 12/2021 | Ratakonda | G06F 30/13 |
| 2022/0197234 A1* | 6/2022 | Patil | F24F 11/38 |
| 2023/0116873 A1* | 4/2023 | Wallace | F24F 11/47 |
| | | | 700/276 |

\* cited by examiner

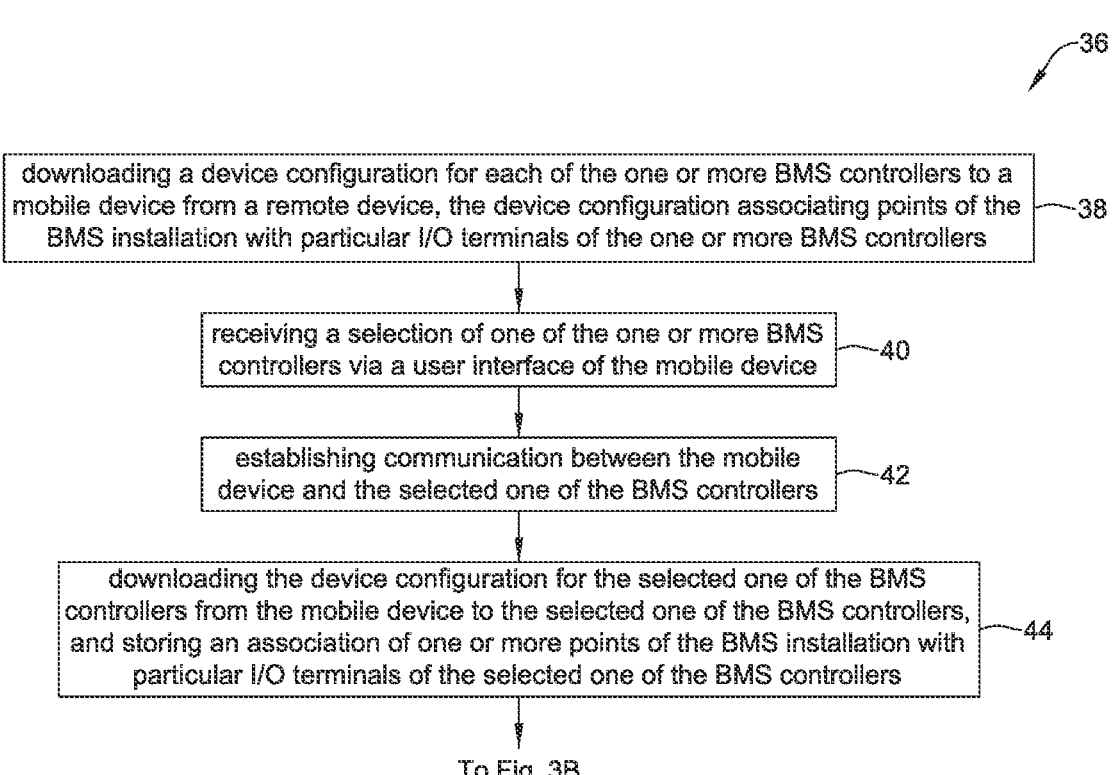

downloading a device configuration for each of the one or more BMS controllers to a mobile device from a remote device, the device configuration associating points of the BMS installation with particular I/O terminals of the one or more BMS controllers —38 receiving a selection of one of the one or more BMS controllers via a user interface of the mobile device —40 establishing communication between the mobile device and the selected one of the BMS controllers —42 downloading the device configuration for the selected one of the BMS controllers from the mobile device to the selected one of the BMS controllers, and storing an association of one or more points of the BMS installation with particular I/O terminals of the selected one of the BMS controllers —44

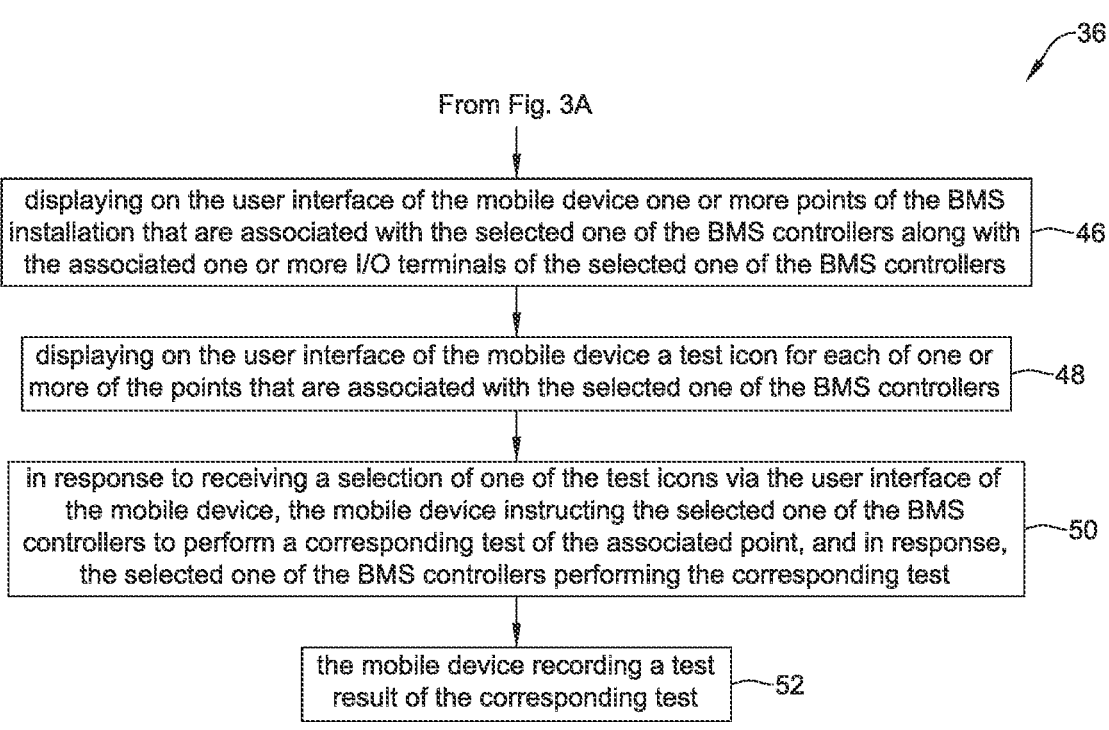

From Fig. 3A displaying on the user interface of the mobile device one or more points of the BMS installation that are associated with the selected one of the BMS controllers along with the associated one or more I/O terminals of the selected one of the BMS controllers ⌐∼46 displaying on the user interface of the mobile device a test icon for each of one or more of the points that are associated with the selected one of the BMS controllers ∼48 in response to receiving a selection of one of the test icons via the user interface of the mobile device, the mobile device instructing the selected one of the BMS controllers to perform a corresponding test of the associated point, and in response, the selected one of the BMS controllers performing the corresponding test ∼50 the mobile device recording a test result of the corresponding test ∼52

FIG. 3B

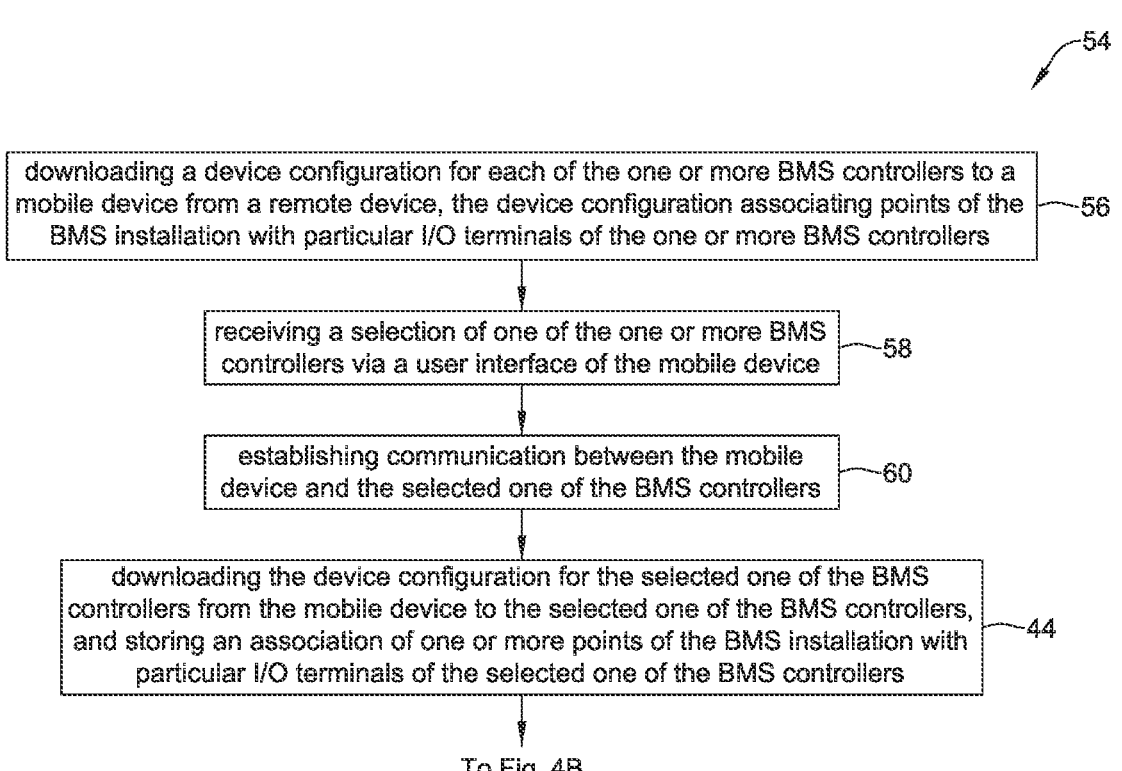

downloading a device configuration for each of the one or more BMS controllers to a mobile device from a remote device, the device configuration associating points of the BMS installation with particular I/O terminals of the one or more BMS controllers ——56 receiving a selection of one of the one or more BMS controllers via a user interface of the mobile device ——58 establishing communication between the mobile device and the selected one of the BMS controllers ——60 downloading the device configuration for the selected one of the BMS controllers from the mobile device to the selected one of the BMS controllers, and storing an association of one or more points of the BMS installation with particular I/O terminals of the selected one of the BMS controllers ——44

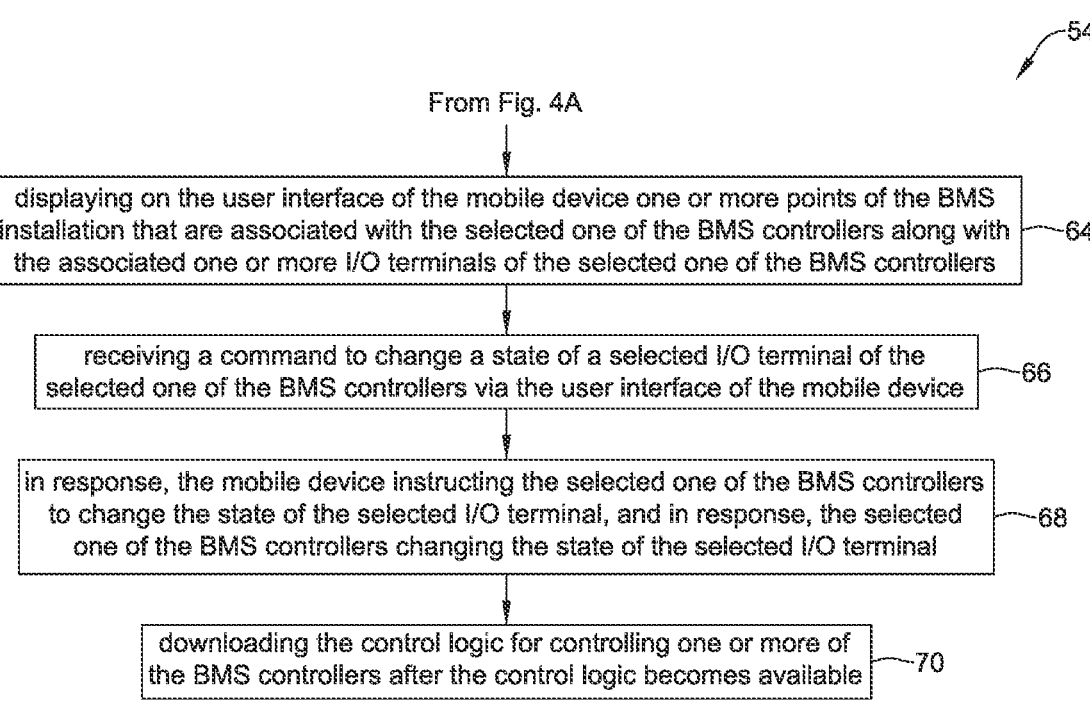

From Fig. 4A displaying on the user interface of the mobile device one or more points of the BMS installation that are associated with the selected one of the BMS controllers along with the associated one or more I/O terminals of the selected one of the BMS controllers ⎯64 receiving a command to change a state of a selected I/O terminal of the selected one of the BMS controllers via the user interface of the mobile device ⎯66 in response, the mobile device instructing the selected one of the BMS controllers to change the state of the selected I/O terminal, and in response, the selected one of the BMS controllers changing the state of the selected I/O terminal ⎯68 downloading the control logic for controlling one or more of the BMS controllers after the control logic becomes available ⎯70

FIG. 4B

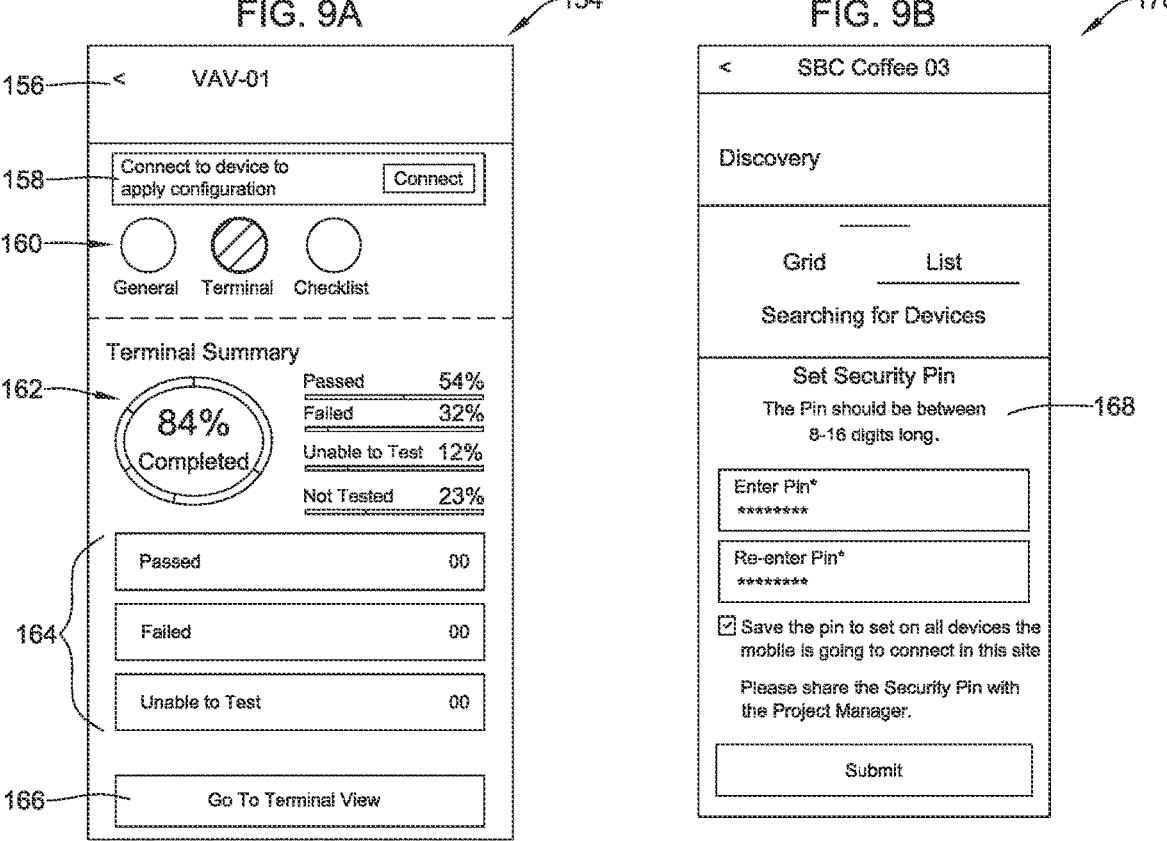

156 — <    VAV-01

158 — Connect to device to apply configuration    Connect

160 — General    Terminal    Checklist

Terminal Summary

162 — 84% Completed

| Passed | 54% |
| Failed | 32% |
| Unable to Test | 12% |
| Not Tested | 23% |

164 —
| Passed | 00 |
| Failed | 00 |
| Unable to Test | 00 |

166 — Go To Terminal View

FIG. 9B

<    SBC Coffee 03

Discovery

Grid      List

Searching for Devices

Set Security Pin

The Pin should be between 8-16 digits long.    — 168

Enter Pin*
********

Re-enter Pin*
********

☑ Save the pin to set on all devices the mobile is going to connect in this site Please share the Security Pin with the Project Manager.

Submit

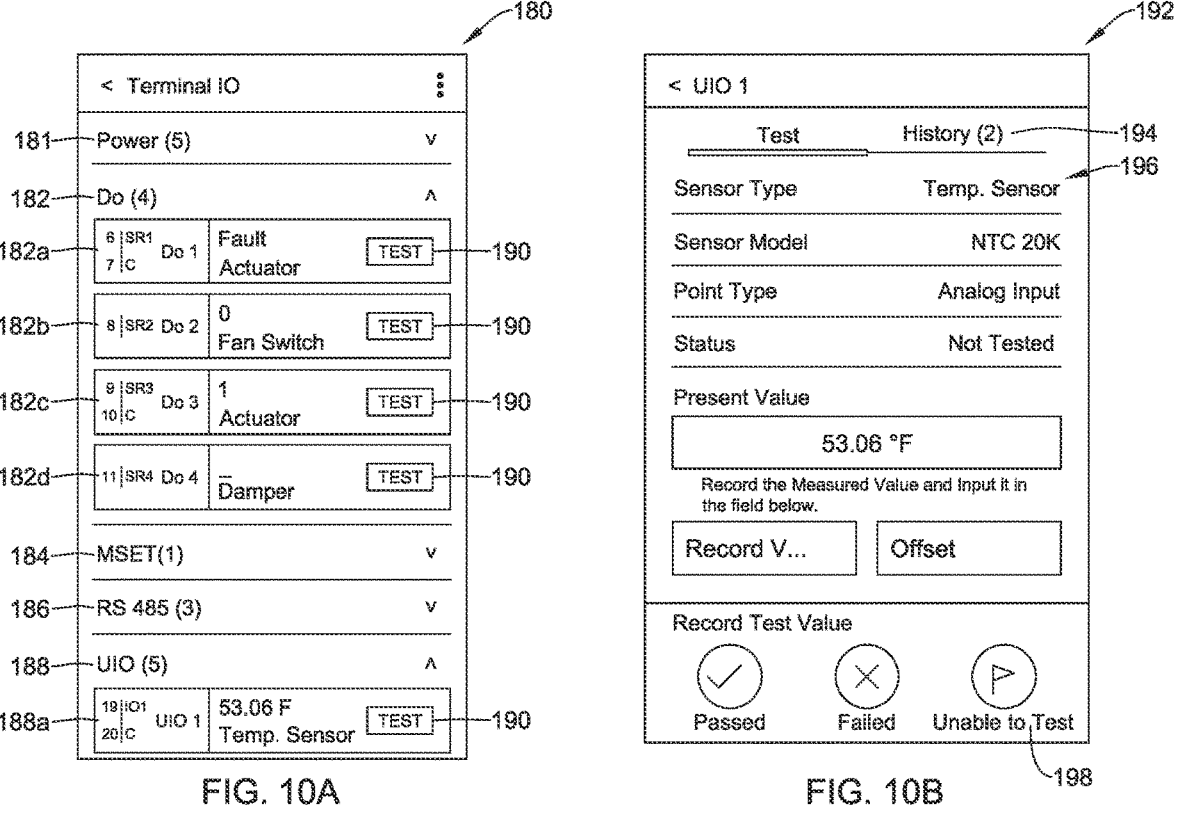
FIG. 10A                    FIG. 10B

INTUITIVE POINT AND WIRING CHECKOUT OF A BUILDING MANAGEMENT SYSTEM USING A MOBILE DEVICE

TECHNICAL FIELD

The present disclosure pertains to building management systems and more particularly to methods and systems for intuitive point and wiring checkout of a building management system before the control logic for all of the building management system controllers of the building management system has been defined and made available.

BACKGROUND

A variety of building management systems are known, such as but not limited to Heating, Ventilating and Air Conditioning (HVAC) systems, security systems, lighting systems, fire systems, water systems, energy distribution systems and/or other building management systems. Building management systems can be complicated, and can include a large number of building management system components. Each of these components may need to be mounted, wired, configured and tested to bring the building management system online. It will be appreciated that this can be a tedious and time consuming task for many building management systems.

Often, the points for each of the building management system controllers and the wiring of the building management system controllers and other building management system components can be defined early for a particular installation, but the operational software may take more time to develop (e.g. by the engineering team). The operational software may include, for example, the control logic that defines the particular logical relationship between the input signals (e.g. input points) received by a particular building management system controller and the output signals (e.g. output points) provided by the corresponding building management system controller.

What would be desirable is a method and system for performing a point and wiring checkout of a building management system after the points and wiring of the building management system have been defined, but before all of the control logic for the building management system controllers has been defined and made available. This may allow an installer to install the various components of a building management system in a building, and perform a point and wiring checkout of the building management system before the control logic for all of the building management system controllers has been defined and made available. This may shortening the timeline needed to bring a building management system online.

SUMMARY

This disclosure relates to building management systems and more particularly to method and systems for intuitive point and wiring checkout of a building management system before the control logic for all of the building management system controllers of the building management system has been defined and made available. An example may be found in a method for performing a checkout of a Building Management System (BMS) installation that includes one or more installed BMS controllers before at least some control logic for controlling one or more of the BMS controllers is available for download. The illustrative method includes downloading a device configuration for each of the one or more BMS controllers to a mobile device from a remote device, the device configuration associating points of the BMS installation with particular I/O terminals of the one or more BMS controllers. A selection of one of the one or more BMS controllers is received via a user interface of the mobile device. Communication is established between the mobile device and the selected one of the BMS controllers. The device configuration for the selected one of the BMS controllers is downloaded from the mobile device to the selected one of the BMS controllers. This includes storing an association of one or more points of the BMS installation with particular I/O terminals of the selected one of the BMS controllers. The method further includes displaying on the user interface of the mobile device one or more points of the BMS installation that are associated with the selected one of the BMS controllers along with the associated one or more I/O terminals of the selected one of the BMS controllers. A test icon may be displayed on the user interface of the mobile device for each of one or more of the points that are associated with the selected one of the BMS controllers. In response to receiving a selection of one of the test icons via the user interface of the mobile device, the mobile device instructs the selected one of the BMS controllers to perform a corresponding test of the associated point, and in response, the selected one of the BMS controllers performs the corresponding test and sends a test result to the mobile device. The mobile device records the test result of the corresponding test.

Another example may be found in a method for performing a checkout of a Building Management System (BMS) installation that includes one or more installed BMS controllers before at least some control logic for controlling one or more of the BMS controllers is available for download. The illustrative method includes downloading a device configuration for each of the one or more BMS controllers to a mobile device from a remote device, the device configuration associating points of the BMS installation with particular I/O terminals of the one or more BMS controllers. A selection of one of the one or more BMS controllers is received via a user interface of the mobile device and communication is established between the mobile device and the selected one of the BMS controllers. The device configuration for the selected one of the BMS controllers is downloaded from the mobile device to the selected one of the BMS controllers, and an association of one or more points of the BMS installation with particular I/O terminals of the selected one of the BMS controllers is stored. The illustrative method further includes displaying on the user interface of the mobile device one or more points of the BMS installation that are associated with the selected one of the BMS controllers along with the associated one or more I/O terminals of the selected one of the BMS controllers. A command is received to change a state of a selected I/O terminal of the selected one of the BMS controllers via the user interface of the mobile device, and in response the mobile device instructs the selected one of the BMS controllers to change the state of the selected I/O terminal, and in response, the selected one of the BMS controllers changes the state of the selected I/O terminal.

Another example may be found in a method of connecting Building Management System (BSM) devices to a BMS controller. The BMS controller is configured to subsequently utilize both a point list and a downloaded control logic in receiving signals from BMS devices and sending command signals to BMS devices of a BMS system. A mobile device is configured to execute an application, wherein the application includes a point list for the BMS controller. The method includes wiring one or more BMS devices to corresponding terminals on the BMS controller prior to the control logic being downloaded to the BMS controller. The BMS controller is then wirelessly coupled to the mobile device. The mobile device downloads the point list of the application to the BMS controller without downloading the control logic to the BMS controller. The mobile device interrogates the BMS controller to obtain one or more values, and displays the obtained one or more values on a display of the mobile device.

Another example may be found in a Building Management System (BMS) controller that is configured operate a BMS system including a plurality of BMS devices. The BMS controller is configured to operate at least part of the BMS system in accordance with both a point list and a control logic. The BMS controller includes a plurality of wiring terminals configured to be wired to a plurality of BMS devices, a wireless radio, and a controller that is operably coupled with the plurality of wiring terminals and the wireless radio. The controller is configured to form a wireless connection with a mobile device, receive dynamic IO terminal configurations from the mobile device, receive a point list from the mobile device, and provide current values from each of at least some of the plurality of wiring terminals to the mobile device. The controller is configured to receive the point list from the mobile device and provide current values from each of the plurality of wiring terminals to the mobile device even in the absence of the control logic.

Another example may be found in a non-transient, computer-readable storage medium having instructions stored thereon that can be executed by one or more processors of a building controller of a BMS system. When the instructions are executed, the one or more processors are caused to form a wireless connection between the building controller and a mobile device. The one or more processors are caused to receive an IO terminal configuration from the mobile device. The one or more processors are caused to receive a point list from the mobile device. The one or more processors are caused to provide current values from each of the plurality of wiring terminals to the mobile device. The one or more processors are caused to execute a checkout utility even in the absence of all of the control logic of the building controller being available to the one or more processors.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 3A and 3B are flow diagrams that together show an illustrative method for performing a checkout of a BMS installation;

FIGS. 4A and 4B are flow diagrams that together show an illustrative method for performing a checkout of a BMS installation;

FIGS. 9A through 9D are screen shots from an illustrative application executing on a mobile device;

FIGS. 10A through 10C are screen shots from an illustrative application executing on a mobile device;

Figure 1:
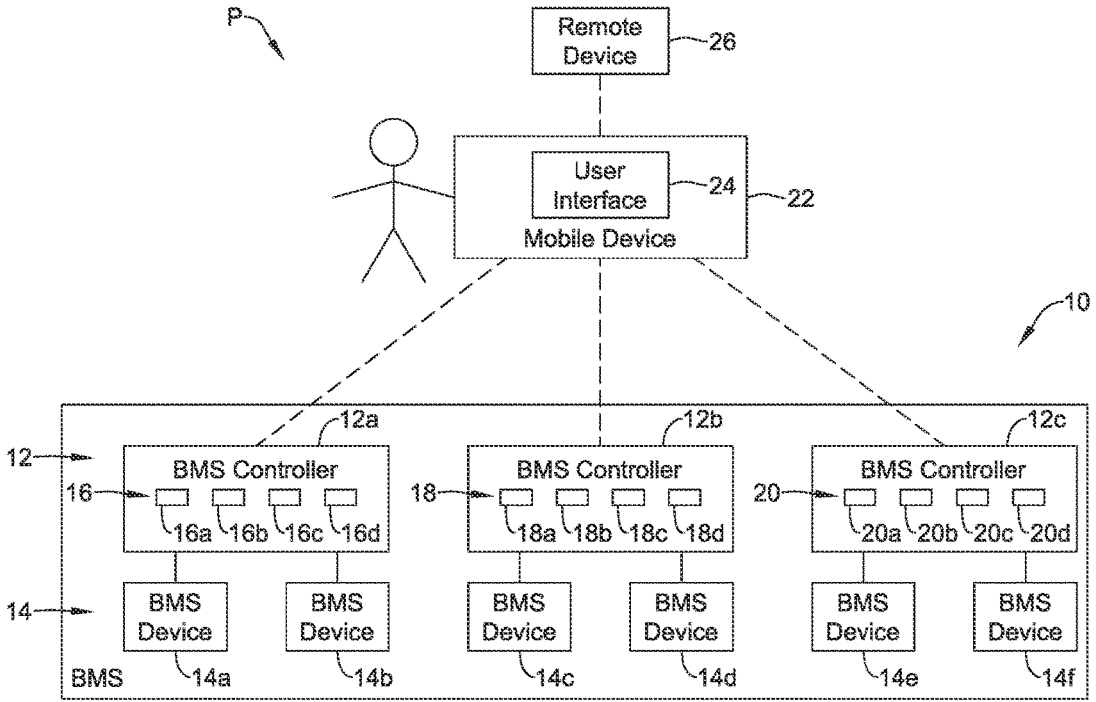
FIG. 1 is a schematic block diagram of an illustrative Building Management System (BMS)

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "of" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative Building Management System (BMS) 10. The BMS 10 may represent any of a variety of different building management systems, such as but not limited to a Heating, Ventilating and Air Conditioning (HVAC) system, a building security system, a building lighting system, and others. The BMS 10 includes a number of BMS controllers 12, individually labeled as 12a, 12b and 12c. While a total of three BMS controllers 12 are shown, this is merely illustrative as the BMS 10 may include any number of BMS controllers 12 and in some cases may include considerably more than three BMS controllers 12. Each of the BMS controllers 12 may be operably coupled with one or BMS devices 14, individually labeled as 14*a*, 14*b*, 14*c*, 14*d*, 14*e*, and 14*f* While each BMS controller 12 is shown is being operably coupled with two BMS devices 14, this is merely illustrative, as each BMS controller 12 may be operably coupled with one BMS device 14, two BMS devices 14, three BMS devices 14 or more.

At least some of the BMS devices 14 may be sensors. For example, if the BMS 10 represents an HVAC system, at least some of the BMS devices 14 may be temperature sensors, humidity sensors or IAQ (Indoor Air Quality) sensors such as carbon monoxide sensors, carbon dioxide sensors, TVOC (Total Volatile Organic Compounds) sensors, particulate sensors such as PM2.5 sensors, and others. At least some of the BMS devices 14 may be actuatable devices that may be controlled by the BMS controllers 12. Again, if the BMS 10 represents an HVAC system, at least some of the BMS devices 14 may be AHU (Air Handling Units) or VAV (Variable Air Volume) boxes, heating sources, cooling sources, ventilation sources such as a fresh air damper, and others. In some cases, one or more of the BMS devices 14 may be a BMS controller 12. In this case, one BMS controller 12 may provide control signal to another BMS controller (e.g. in a master/slave relationship, daisy chain relationship, supervisory relationship, etc.).

In some cases, at least some of the BMS devices 14 may be wirelessly coupled with a corresponding BMS controller 12. In some cases, at least some of the BMS devices 14 may be wired to a corresponding BMS controller 12. In some cases, each of the BMS controllers 12 include a number of wiring terminals that may be used to make wired connections between a BMS controller 12 and one or more of the BMS devices 14 to which the BMS controller 12 needs to be coupled. The BMS controller 14*a* includes a number of wiring terminals 16, individually labeled as 16*a*, 16*b*, 16*c* and 16*d*. The BMS controller 14*b* includes a number of wiring terminals 18 individually labeled as 18*a*, 18*b*, 18*c* and 18*d*. The BMS controller 14*c* includes a number of wiring terminals 20 individually labeled as 20*a*, 20*b*, 20*c* and 20*d*. While each of the BMS controllers 14 are shown as including a total of four wiring terminals 16, 18, 20 (respectively), this is merely illustrative as each of the BMS controllers 14 may include any number of wiring terminals 16, 18 and 20. In some cases, at least some of the wiring terminals 16, 18 and 20 may be configured to provide a spring-loaded connection to a wire that is placed under the corresponding wiring terminal. In some cases, at least some of the wiring terminals 16, 18 and 20 may include a screw that may be threaded down onto a wire in order to secure the wiring to the wiring terminal.

A mobile device 22 may be used by a person P in performing various processes related to the BMS 10. For example, the mobile device 22 may be used in downloading software to at least some of the BMS controllers 12. The mobile device 22 may be used in performing a checkout of the installation including how the BMS devices 14 are connected with the corresponding BMS controllers 12. The mobile device 22 includes a user interface 24. In some cases, the mobile device 22 may be a tablet or a smartphone, and thus the user interface 24 may be a touch screen display, for example. In some cases, the mobile device 22 may be a laptop computer, and thus the user interface 24 may include a keyboard, mouse or tracking station, and of course a display that may or may not be a touch screen.

The mobile device 22 may be configured to communicate with a remote device 26 in order to receive (and in some cases transmit) information from (to) the remote device 26. The information may include configuration information for particular BMS controllers 12, for example. The configuration information may include point lists for particular BMS controllers 12. These are just examples. In some cases, the mobile device 22 may communicate with the remote device 26 over a cellular network, over the Internet, or in any other suitable manner. In some cases, the remote device 26 may be a computer server that may be located in or near a building in which the BMS 10 is installed. In some cases, the remote device 26 may be a computer server that is located remote from the building in which the BMS 10 is installed. As an example, the remote device 26 may be a cloud-based server.

Figure 2:
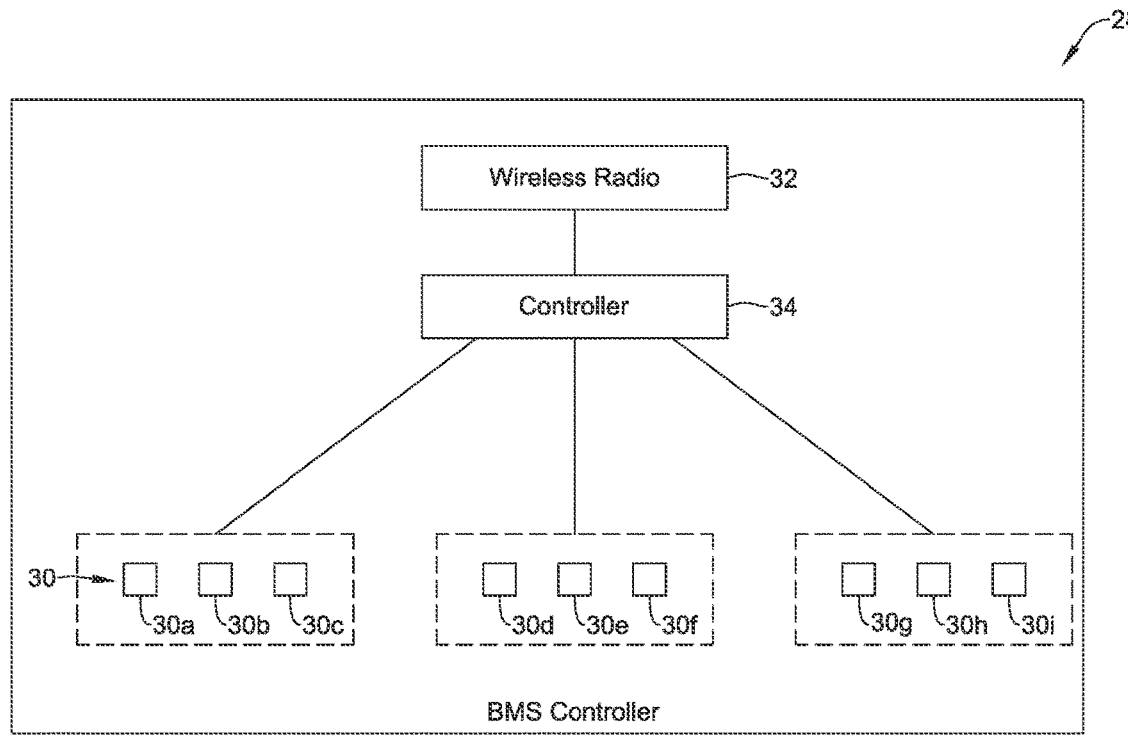
FIG. 2 is a schematic block diagram of an illustrative BMS controller usable in the illustrative BMS of FIG. 1.

FIG. 2 is a schematic block diagram of an illustrative BMS controller 28. The BMS controller 28 may be considered as being an example of one of the BMS controllers 12. The BMS controller 28 is configured to operate at least part of a BMS (such as at least part of the BMS 10) that includes one or more BMS devices (such as the BMS devices 14). As an example, the BMS devices may include IO modules and/or IO devices. In some cases, the BMS controller 28 may be configured to operate in accordance with both a point list and a control logic. The illustrative BMS controller 28 includes a number of wiring terminals 30, individually labeled as 30*a*, 30*b*, 30*c*, 30*d*, 30*e*, 30*f*, 30*g*, 30*h* and 30*i*. This is merely illustrative, as the BMS controller 28 may include any number of wiring terminals 30. The illustrative BMS controller 28 includes a wireless radio 32 (e.g., WiFi, Bluetooth, Zigbee, Redlink, etc.) and a controller 34 that is operably coupled with the wiring terminals 30 and with the wireless radio 32.

The controller 34 may be configured to form a wireless connection with a mobile device such as the mobile device 22 and to receive dynamic (e.g. programmable) IO terminal configurations from the mobile device. The controller 34 may be configured to receive a point list from the mobile device via the wireless radio 32. In some cases, the controller 34 may be configured to provide current values from each of at least some of the wiring terminals 30 to the mobile device to facilitate the mobile device in executing a checkout utility on the BMS controller 28. In some cases, the controller 34 may be configured to receive the point list from the mobile device and provide current values from each of the plurality of wiring terminals 30 to the mobile device even in the absence of the control logic being loaded onto the BMS controller 28. The controller 34 may be configured to subsequently receive the control logic via the wireless radio 32 at a point in time after the checkout utility has been completed. In some cases, the controller 34 may be configured to send operational commands to at least some of the BMS devices as part of the checkout utility (e.g. open a damper of a connected BMS device to a desired position).

Often, the points for each of the BMS controllers 12 and the wiring of the BMS controllers 12 and BMS devices 14 can be defined early for a particular installation, but the operational software may take more time to develop (e.g. by the engineering team). The operational software may include, for example, the control logic that defines the particular logical relationship between the input signals (e.g. input points) received by a particular BMS controller 12 and the output signals (e.g. output points) provided by the corresponding BMS controller 12. FIGS. 3A and 3B are flow diagrams that together show an illustrative method 36 for performing a checkout of a Building Management System (BMS) installation (such as the BMS 10) that includes one or more installed BMS controllers (such as the BMS controllers 12) before at least some control logic for controlling one or more of the BMS controllers is available for download.

The illustrative method 36 includes downloading a device configuration for each of one or more of the BMS controllers to a mobile device (such as the mobile device 22) from a remote device (such as the remote device 26). The device configuration associates points of the BMS installation with particular I/O terminals of the one or more BMS controllers, as indicated at block 38. The device configuration may further include, for at least some of the BMS controllers, a device name, a device description, a device location within the building, a terminal type for each of the I/O terminals (e.g., Universal IO, Digital Output, Digital Input, Universal Input, Analog Input, Analog Output), I/O characteristics for each of the I/O terminals (e.g. 0-10V, 4-20 ma), Sensor Types associated with particular points, Offsets associated with particular points, one or more BMS communication bus parameters (e.g. RS 485 channel parameters such as channel type (Modbus, Fieldbus, Bacnet), comm parameters such as baud rate, stop bits, parity, network number, instance ID for the particular BMS controller, and/or any other suitable device configuration parameter. These device configuration parameters may be displayed on the user interface of the mobile device.

A selection of one of the one or more BMS controllers is received via a user interface of the mobile device, as indicated at block 40. The method 36 includes establishing communication between the mobile device and the selected one of the BMS controllers, as indicated at block 42. In some cases, establishing communication between the mobile device and the selected one of the BMS controllers may include establishing wireless communication (e.g. WiFi or Bluetooth). The device configuration for the selected one of the BMS controllers is downloaded from the mobile device to the selected one of the BMS controllers, and an association of one or more points of the BMS installation with particular I/O terminals of the selected one of the BMS controllers is stored, as indicated at block 44.

The method 36 continues on FIG. 3B, with displaying on the user interface of the mobile device one or more points of the BMS installation that are associated with the selected one of the BMS controllers along with the associated one or more I/O terminals of the selected one of the BMS controllers, as indicated at block 46. In some cases, a test icon for each of one or more of the points that are associated with the selected one of the BMS controllers is displayed on the user interface of the mobile device, as indicated at block 48. In response to receiving a selection of one of the test icons via the user interface of the mobile device, the mobile device instructs the selected one of the BMS controllers to perform a corresponding test of the associated point, and in response, the selected one of the BMS controllers performs the corresponding test, as indicated at block 50. In some cases, performing the corresponding test by the selected one of the BMS controllers includes changing a state of one or more of the associated I/O terminals of the selected one of the BMS controllers, comparing an input value received from a BMS device with an expected range of input values from the BMS device, and/or perform any other suitable action.

The mobile device records a test result of the corresponding test, as indicated at block 52. In some cases, the selected one of the BMS controllers communicates the test result to the mobile device. In some instances, the test result is entered via the user interface of the mobile device. In some cases, the mobile device uploads the test results of the corresponding test to the remote device. In some cases, at some time after the mobile device records the test result of the corresponding test, the method includes downloading the control logic for controlling one or more of the BMS controllers after the control logic becomes available.

In some instances, the corresponding test may include the selected one of the BMS controllers reading a sensor value from a sensor (e.g. a BMS device) connected to one or more of the I/O terminals of the selected one of the BMS controllers, wherein the test result includes the sensor value. In some cases, the method 36 may include receiving a user measured sensor value via the user interface of the mobile device. The method 36 may include the mobile device comparing the sensor value of the test result with the user measured sensor value and automatically calculating an offset for the sensor value of the selected one of the BMS controllers. The offset for the sensor value from the mobile device may be communicated to the selected one of the BMS controllers, and the selected one of the BMS controllers may apply the offset to the sensor value during subsequent operation of the selected one of the BMS controllers. The offset for the sensor value may also be communicated from the mobile device to the Remote Device 26.

In some cases, the method 36 may include communicating a value of each of one or more of the points that are associated with the selected one of the BMS controllers from the selected one of the BMS controllers to the mobile device and displaying the value of one or more of the points that are associated with the selected one of the BMS controllers on the user interface of the mobile device. In some instances, the value may be repeatedly updated, communicated and displayed at a rate of more than once per minute (e.g. one per 5 seconds, once per 3 seconds, once per 1 second, etc.). In some instances, the method 36 may include displaying a fault associated with one or more of the points that are associated with the selected one of the BMS controllers on the user interface of the mobile device. The fault may be determined based on the test result of the corresponding test of the associated point, for example.

In some cases, the method 36 may include displaying a listing of a plurality of BMS controllers of the BMS installation on the user interface of the mobile device and allowing selection of one of the plurality of BMS controllers from the listing of the plurality of BMS controllers via the user interface of the mobile device. The method 36 may include receiving an input via the user interface of the mobile device that changes the device configuration for the selected one of the BMS controllers, resulting in a changed device configuration, and uploading the changed device configuration from thee mobile device to the remote device.

The method 36 may include receiving a command to change a state of a selected I/O terminal of the selected one of the BMS controllers via the user interface of the mobile device, and in response, the mobile device may instruct the selected one of the BMS controllers to change the state of the selected I/O terminal, and in response, the selected one of the BMS controllers changes the state of the selected I/O terminal. This may allow a user of the mobile device to, for example, open and close a damper to confirm the damper is wired and operating as expected. In another example, this may allow a user of the mobile device to, turn a fan, heating unit or cooling unit on and off to confirm the fan, heating unit or cooling unit is wired and operating as expected. These are just some examples for an HVAC system.

FIGS. 4A and 4B are flow diagrams that together show an illustrative method 54 for performing a checkout of a Building Management System (BMS) installation (such as the BMS 10) that includes one or more installed BMS controllers (such as the BMS controllers 12) before at least some control logic for controlling one or more of the BMS controllers is available for download. The method 54 includes downloading a device configuration for each of the one or more BMS controllers to a mobile device from a remote device, the device configuration associating points of the BMS installation with particular I/O terminals of the one or more BMS controllers, as indicated at block 56. A selection of one of the one or more BMS controllers is received via a user interface of the mobile device, as indicated at block 58. Communication is established between the mobile device and the selected one of the BMS controllers, as indicated at block 60. The device configuration for the selected one of the BMS controllers is downloaded from the mobile device to the selected one of the BMS controllers, and an association of one or more points of the BMS installation with particular I/O terminals of the selected one of the BMS controllers is stored, as indicated at block 62.

The method 54 continues on FIG. 4B, with displaying on the user interface of the mobile device one or more points of the BMS installation that are associated with the selected one of the BMS controllers along with the associated one or more I/O terminals of the selected one of the BMS controllers, as indicated at block 64. A command to change a state of a selected I/O terminal of the selected one of the BMS controllers is received via the user interface of the mobile device, as indicated at block 66. In response, the mobile device instructs the selected one of the BMS controllers to change the state of the selected I/O terminal, and in response, the selected one of the BMS controllers changes the state of the selected I/O terminal, as indicated at block 68. In some cases, at some point after the selected one of the BMS controllers changes the state of the selected I/O terminal, the control logic for controlling one or more of the BMS controllers may be downloaded when the control logic becomes available.

Figure 5:
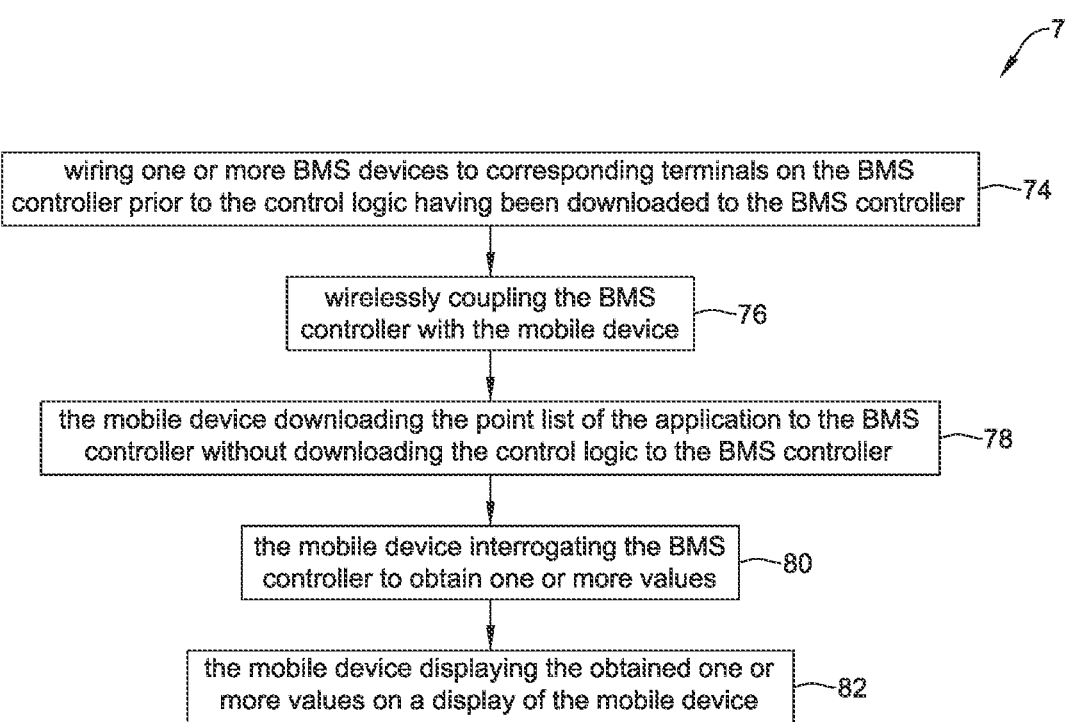
FIG. 5 is a flow diagram showing an illustrative method for connecting BMS devices to a BMS controller.

FIG. 5 is a flow diagram showing an illustrative method 72 of connecting Building Management System (BSM) devices (such as the BMS device 14) to a BMS controller (such as the BMS controller 12). The BMS controller is configured to subsequently utilize both a point list and a downloaded control logic in receiving signals from BMS devices and sending command signals to BMS devices. A mobile device (such as the mobile device 22) is configured to execute an application that includes the point list for the BMS controller. The method 72 includes wiring one or more BMS devices to corresponding terminals on the BMS controller prior to the control logic having been downloaded to the BMS controller, as indicated at block 74. Some of the BMS devices may include IO modules. Some of the BMS devices may include IO devices. Some of the BMS device may include sensors. Some of the BMS device may include actuators. The BMS controller is wirelessly coupled with the mobile device, as indicated at block 76. The mobile device downloads the point list of the application to the BMS controller without downloading the control logic to the BMS controller, as indicated at block 78.

The mobile device interrogates the BMS controller to obtain one or more values, as indicated at block 80. The mobile device displays the obtained one or more values on a display of the mobile device, as indicated at block 82. In some cases, the one or more values may include signal values at the terminals on the BMS controller. In some cases, the one or more values may include signal values provided by the one or more BMS devices wired to the corresponding terminals on the BMS controller. In some cases, the one or more values include controller settings such as one or more of serial number, UUUID (universally unique identifier), firmware version and model name and/or one or more of the device configuration parameters stored by the BMS controller.

In some cases, the method 72 may include the mobile device executing the application to record a test result for each of one or more of the terminals. The mobile device may also execute the application displaying the recorded test results. In some cases, the mobile device may execute the application uploading the recorded test results to a remote server. In some cases, the recorded test results include one or more of site name, street address, list of controllers, list of each IO terminals, sensor values at the time of the test, sensor offset, checkout status, test result, time of test, name of person performing the test, and/or any other suitable information.

In some cases, the method 72 may include highlighting terminal values that are out of range. In some cases, the mobile device executing the application may be configured to send operational commands to at least some of the BMS devices in order to test operation of the particular BMS device. In some cases, the method 72 may include subsequently using the application on the mobile device in downloading the control logic to the BMS controller(s).

Figure 6:
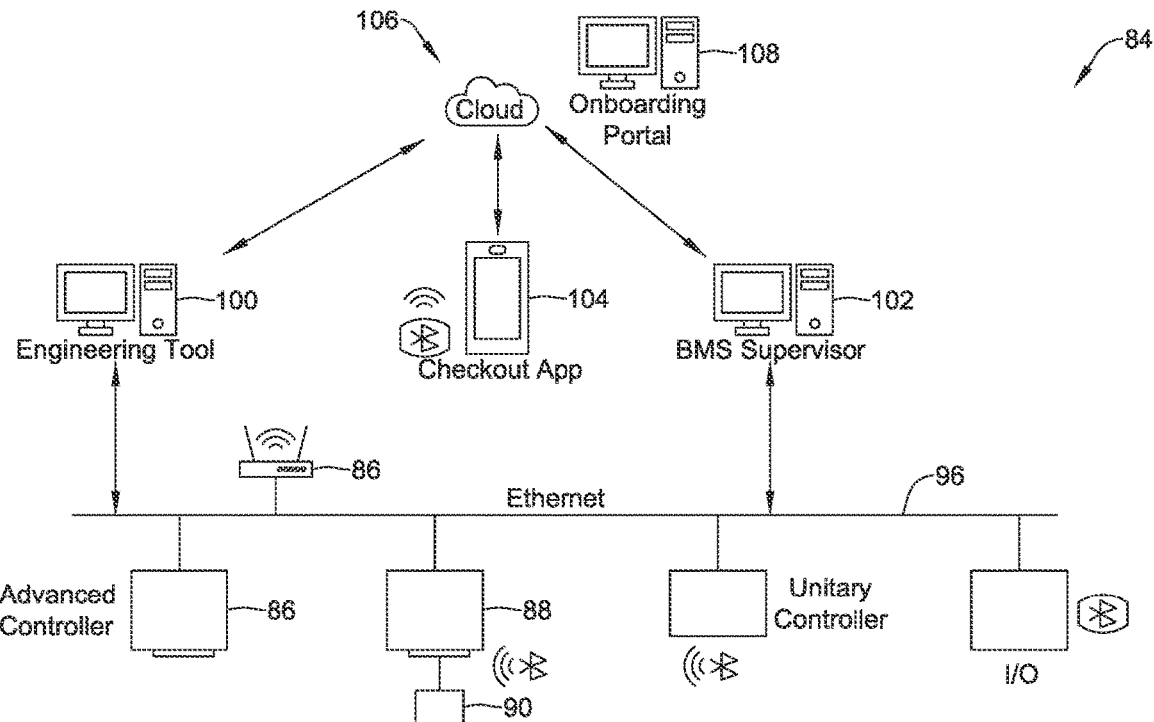
FIG. 6 is a schematic block diagram of an illustrative BMS architecture.

FIG. 6 is a schematic block diagram showing an illustrative architecture 84 of a BMS. The illustrative architecture 84 may be considered as being an example of the BMS 10. The architecture 84 includes a number of BMS controllers including an advanced BMS controller 86 that does not include any built-in wireless communication capabilities, a Bluetooth-enabled advanced BMS controller 88 that is operably coupled with an BMS IO module 90, a Bluetooth-enabled unitary BMS controller 92 and a Bluetooth-enabled BMS IO module 94. Each of the advanced BMS controller 86, the Bluetooth-enabled advanced BMS controller 88, the Bluetooth-enabled unitary BMS controller 92 and the Bluetooth-enabled BMS IO module 94 are each coupled to a network 96. A WiFi radio 98 is also operably coupled to the network 96. The connections with these devices may be analyzed via a checkout utility.

An Engineering tool 100 and a BMS supervisor 102 are both operably coupled to the network 96. A Checkout App is executable by a mobile device 104. In some cases, the mobile device 104 has both Bluetooth and WiFi communications capabilities. The mobile device 104 may communicate wirelessly with a cloud-based server 106, and communicate with the Engineering tool 100 and the BMS supervisor 102 through the cloud-based server 106, and hence communicate with the advanced BMS controller 86, the Bluetooth-enabled advanced BMS controller 88, the Bluetooth-enabled unitary BMS controller 92 and the Bluetooth-enabled BMS IO module 94 through connections with the network 96. The cloud-based server 106 hosts an Onboarding Portal 108.

Figure 7:
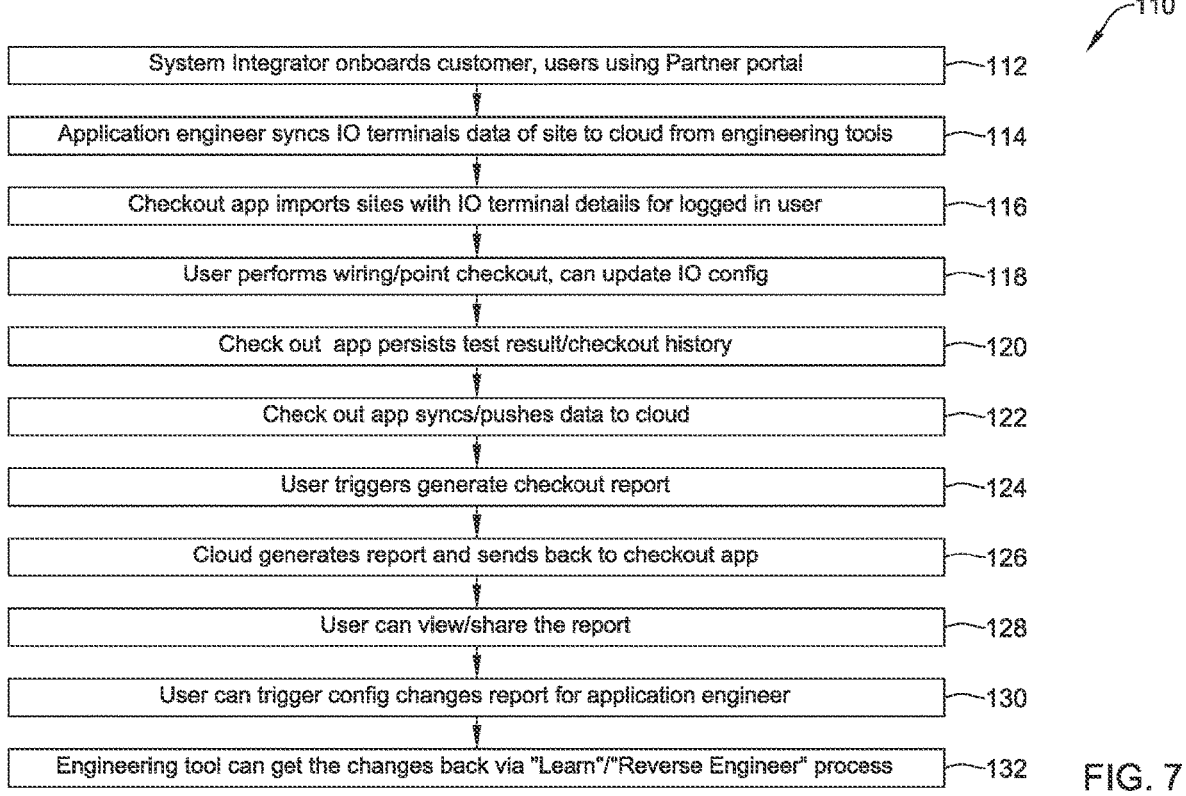
FIG. 7 is a flow diagram showing an illustrative method.

FIG. 7 is a flow diagram showing an illustrative method 110 that may be carried out using the architecture 84 shown in FIG. 6. In FIG. 7, the method 110 includes onboarding a customer, as indicated at block 112. Site data is synched to the cloud, as indicated at block 114. The site data includes points for each of the BMS controllers and the wiring of the BMS controllers and other BMS components for the particular site installation of the customer. The checkout app imports the site data, as indicated at block 116. The user performs wiring checkout and/or points checkout, as indicated at block 118. The checkout app captures test results, as indicated at block 120, and pushes the data to the cloud, as indicated at block 122. In some cases, a user triggers generation of a checkout report, as indicated at block 124. The cloud generates the report and returns the report to the checkout app, as indicated at block 126. The user views and/or shares the report, as indicated at block 128. The user can trigger conflict changes, as indicated at block 130. The conflict changes represent differences between the site data stored on the cloud and the site data stored in the BMS controllers at the customer's site. There may be a difference because the installer of the BMS system may identify errors and make changes to the site data stored in the BMS controllers at the customer's site using the checkout app. Such conflicts, if any, may be shown in the checkout app and/or may be uploaded to an engineering tool in the cloud, as indicated at block 132.

Figures 8A, 8B:
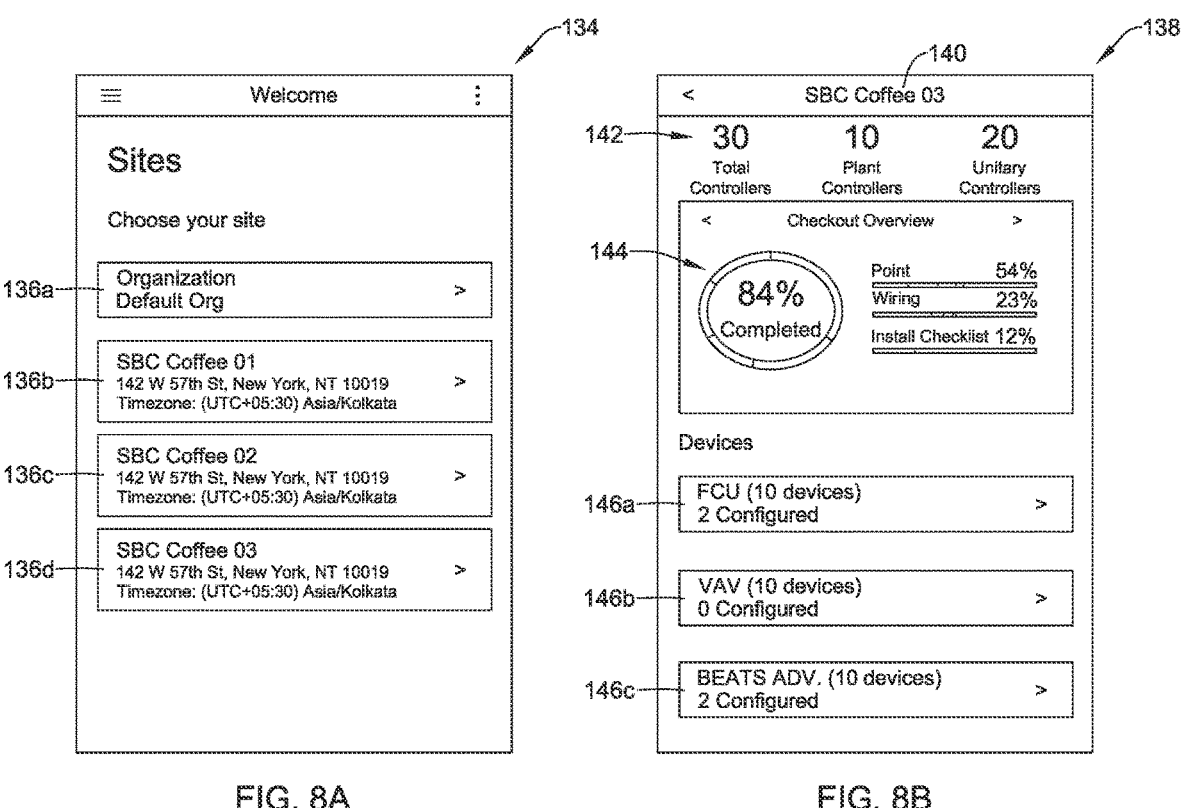
FIGS. 8A through 8C are screen shots from an illustrative application executing on a mobile device.
Figure 8C:
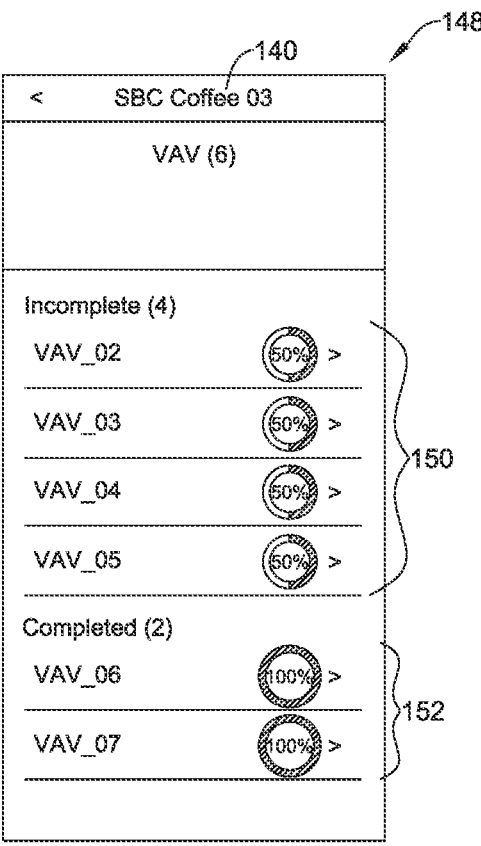

FIGS. 8A through 8C are screen shots from an illustrative application executing on a mobile device (such as the mobile device 22). FIG. 8A shows a screen 134 that allows a user to select an organization at 136*a* and/or select a particular site from several displayed sites 136*b* through 136*d* of the selected organization. FIG. 8*b* shows a screen 138 that may be displayed in response to the user selecting the displayed site 136*d* ("SBC Coffee 03") on the screen 134 (FIG. 8A). The screen 138 includes a title 140 reading "SBC Coffee 03". An info bar 142 indicates that this particular site has a total of 30 controllers, including 10 plant controllers and 20 unitary controllers. The screen 138 includes a checkout overview 144 showing that the checkout is 84 percent completed. The screen 138 also includes a listing of device types, including FCU 146*a* (ten devices), VAV devices 146*b* (ten devices) and Advanced Controllers 146*c* (ten devices). FIG. 8C shows a screen 148 that shows checkout status for a total of six VAV boxes at the "SBC Coffee 03" site. The screen 148 includes a listing 150 showing the VAV boxes for which checkout is not yet complete, and a listing 152 showing the VAV boxes for which checkout has been completed. This screen allows the installer to keep track of which VAV boxes need to be completed. This information may be uploaded by the mobile device to the cloud so others can track the checkout progress of the BMS system. In some cases, the building controllers of a BMS system may be partitioned and assigned to different installers, with each installer focusing on the BMS controllers assigned to them. The checkout progress may be aggregated across all installers to track the overall checkout progress of the BMS system.

Figures 9C, 9D:
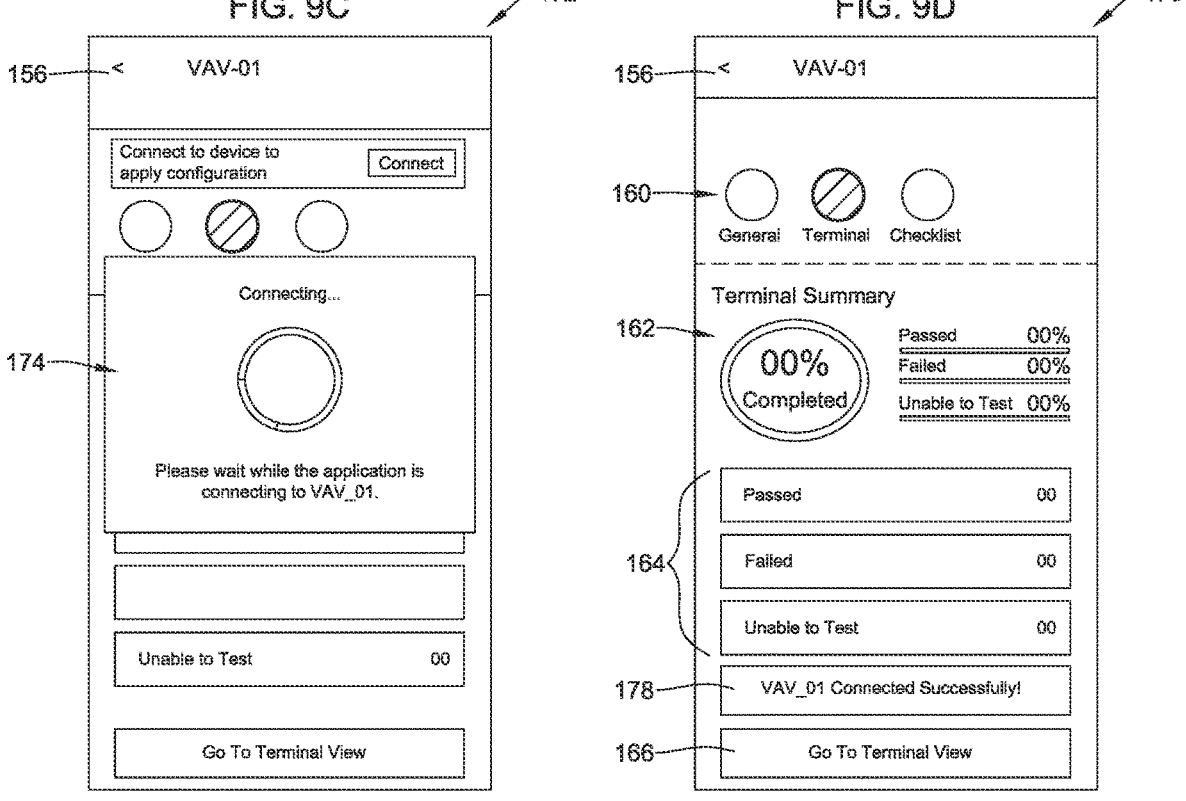

FIGS. 9A through 9D are screen shots from an illustrative application executing on a mobile device (such as the mobile device 22). FIG. 9A shows a screen 154 that includes a title bar 156 indicating that a VAV-01 is undergoing checkout. The screen 154 includes a CONNECT button 158 that may be used to initiate a connection (e.g. WiFi or Bluetooth) of the mobile device to the VAV-01 device. A menu bar 160 allows a user to select between General, Terminal, and Checklist tabs. As shown, the Terminal tab has been selected. The screen 154 includes a terminal summary 162. A section 164 provides a summary of terminals that have passed, terminals that have failed, and those that couldn't be tested. The screen 154 includes a GO TO TERMINAL VIEW button 166. FIG. 9B shows a screen 168 superimposed over a device discover screen 170. The screen 168 allows a user to set a security pin. FIG. 9C shows a screen 172 (such as the screen 154 shown in FIG. 9A) with a superimposed screen 174 showing that connection is underway. FIG. 9D shows a screen 176 that is similar to the screen

154 shown in FIG. 9A, but includes a button 178 indicating that the mobile device has connected successfully to VAV-01.

Figure 10C:
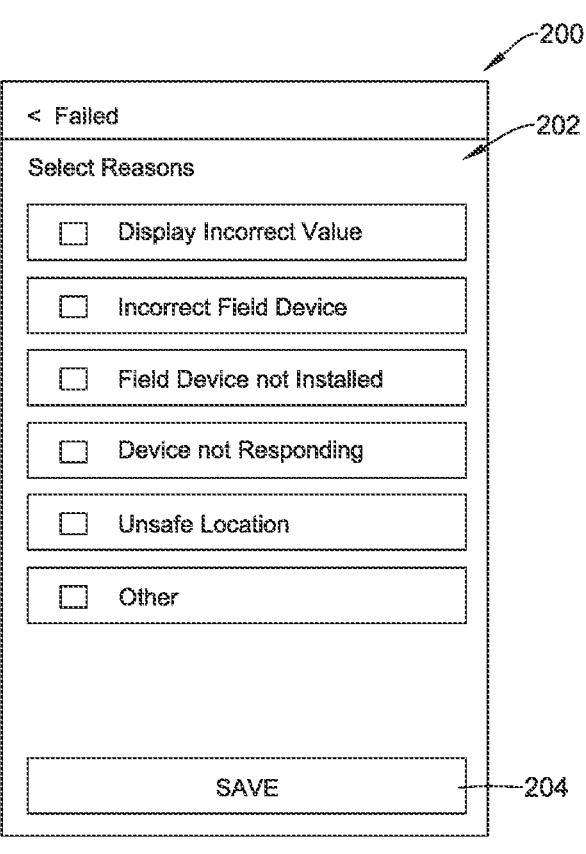

FIGS. 10A through 10C are screen shots from an illustrative application executing on a mobile device (such as the mobile device 22). FIG. 10A shows a screen 180 that lists faults found during a terminal wiring checkout. The screen 180 includes a section 181 that lists power faults, a section 182 that lists DO (digital output) terminal faults, a section 184 that lists MSET faults, a section 186 that lists RS 485 communication faults, and a section 188 that lists UIO (universal input output) faults. The section 182 includes a segment 182*a* that shows a fault associated with an actuator controlled by DO terminal SR1, a segment 182*b* that shows a fan switch controlled by DO terminal SR2, a segment 182*c* that shows an actuator controlled by DO terminal SR3, and a segment 182*d* that shows a damper controlled by DO terminal SR4. In the example shown, each segment 182*a*, 182*b*, 182*c* and 182*d* includes a test button 190. The section 188 includes a segment 188*a* that shows a live value for the terminal UIO1. FIG. 10B shows a screen 192 that results from pressing the test button 190 shown as part of the segment 188*a* in FIG. 10A.

The screen 192 shows test results for the terminal UIO1. A menu bar 194 allows for selecting between Test and History tab. As shown, the Test tab has been selected. As a result, the screen 192 includes a section 196 that provides test results. The screen 192 also includes a tool bar 198 that may be used in recording test values. The tool bar 198 allows for selection between indicating that a PASSED test, a FAILED test and UNABLE TO TEST. FIG. 10C shows a screen 200 that shows a list of possible reasons for a failed test. The user is able to make selections within the list of possible reasons by checking the appropriate boxes. In some cases, the user is able to capture an image, photo or video of the test being performed and upload the image, photo or video of the test. The screen 200 also includes a SAVE button 204 that allows the user to save the selected reasons.

Figures 11A, 11B:
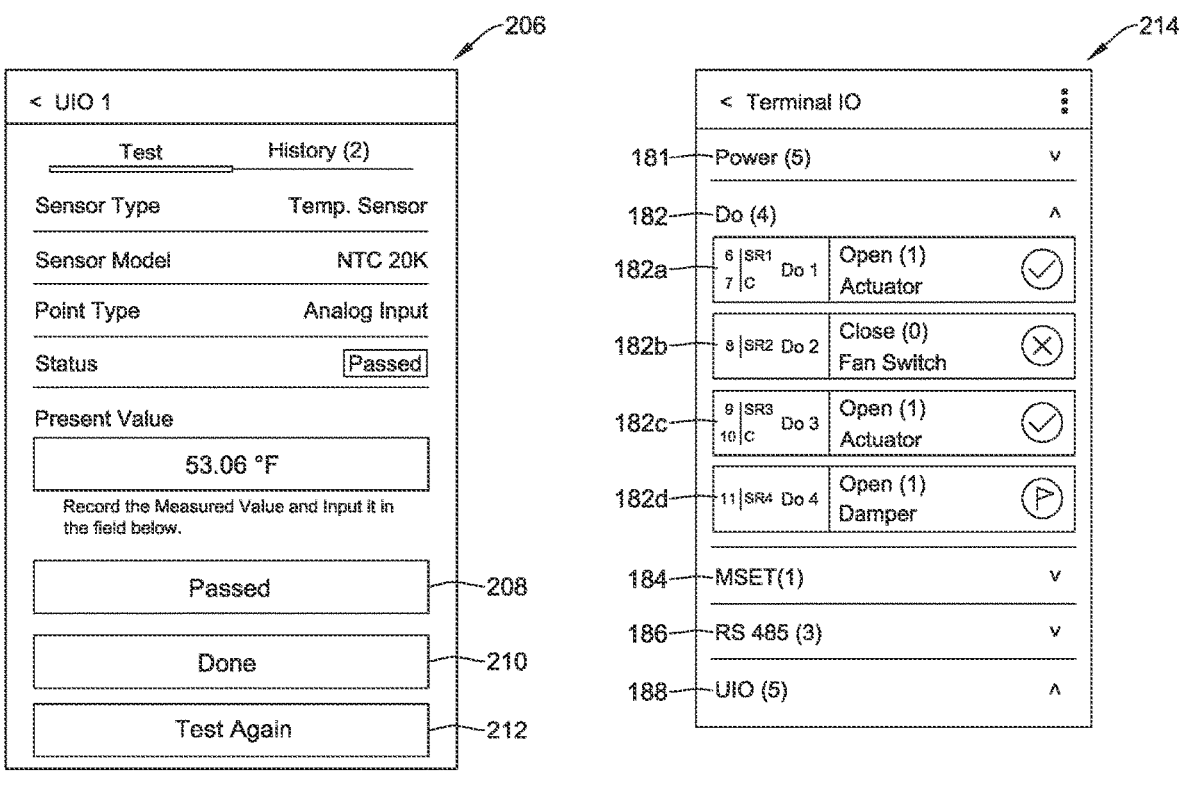
FIGS. 11A through 11C are screen shots from an illustrative application executing on a mobile device.
Figure 11C:
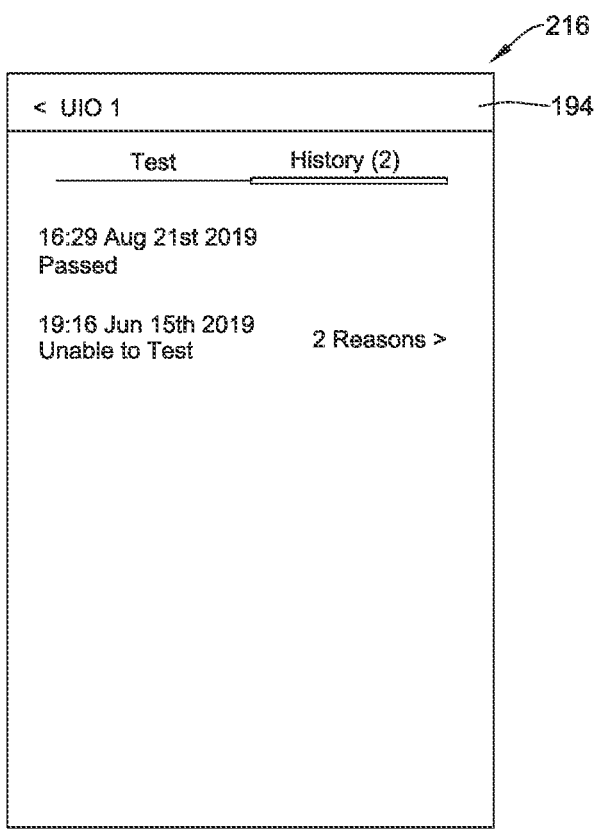

FIGS. 11A through 11C are screen shots from an illustrative application executing on a mobile device (such as the mobile device 22). FIG. 11A shows a screen 206 that is similar to the screen 192 (FIG. 10B), but includes an informational bar 208 indicating that the test was passed. The screen 206 also includes a DONE button 210 that can be selected to terminate testing for that particular device (e.g. terminal), and a TEST AGAIN button 212 that can be selected if there is as desire to retest that particular device (e.g. terminal). The DONE button 210 has been selected. FIG. 11B is similar to screen 180 (FIG. 10A), but shows test results for each terminal. In particular, segments 182*a* and 182*c* show a passing result, segment 182*b* shows a failing result, and segment 182*d* shows that the terminal was unable to be tested. FIG. 11C shows a screen 216 in which the menu bar 194 indicates that the History tab has been selected (while the Test tab was selected in FIG. 10A). The screen 216 shows that the particular device was tested and passed on Aug. 21, 2019 after being unable to test previously on Jun. 15, 2019.

Figures 12A, 12B:
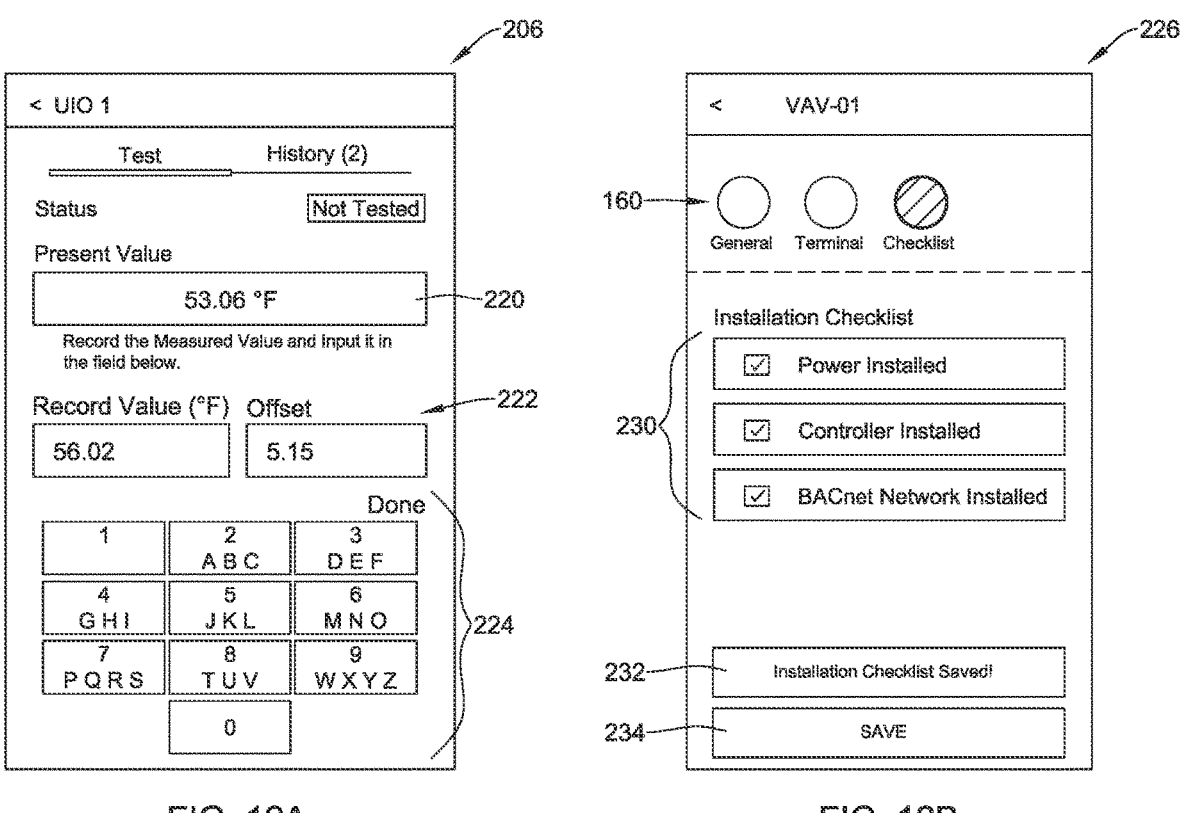
FIGS. 12A through 12C are screen shots from an illustrative application executing on a mobile device.
Figure 12C:
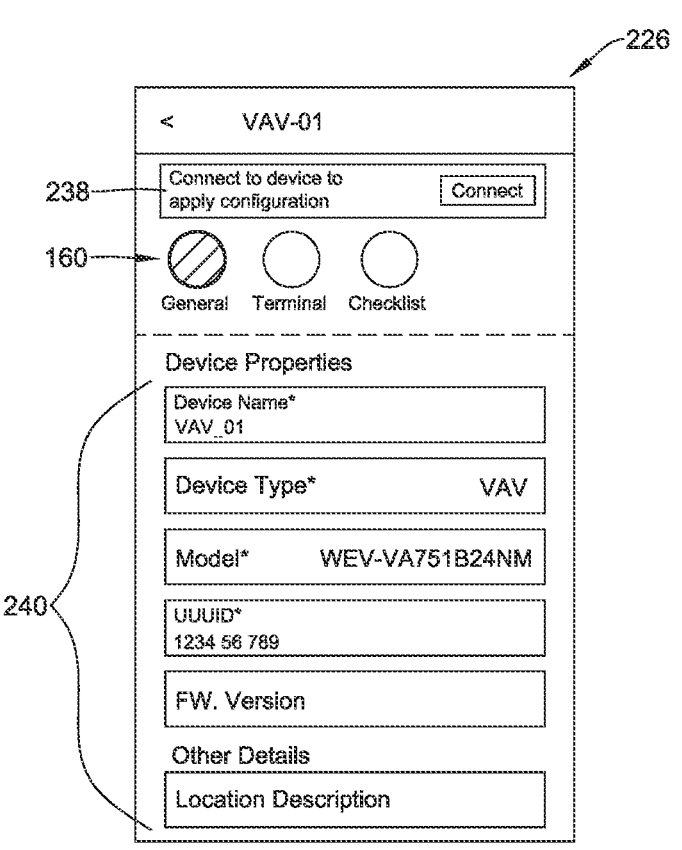

FIGS. 12A through 12C are screen shots from an illustrative application executing on a mobile device (such as the mobile device 22). FIG. 12A shows a screen 218 that allows a user to compare a present sensor value 220. A user is able to measure a current value and enter the current value into a section 222. The screen 218 includes a numerical keypad 224 that the user can use to type in the current value. In some cases, the section 222 also shows an offset, which may be entered by the user or may be automatically calculated from a difference between the present sensor value and the current value. FIG. 12B shows a screen 226 that includes the menu bar 160 that allows a user to select between General, Terminal, and Checklist tabs. As shown, the Checklist tab has been selected. The screen 226 includes a section 230 that shows an installation checklist. The screen 226 also includes an informational bar 232 that informs the user that the installation checklist has been saved, as well as a SAVE button 234 that can be used if the information has not yet been saved. FIG. 12C shows a screen 236 that includes a CONNECT button 238 that may be used to connect to a device in order to apply a configuration. As can be seen in the menu bar 160, the General tab has been selected. As a result, the screen 236 includes a section 240 that includes a variety of general device properties displayed.

Figures 13A, 13B:
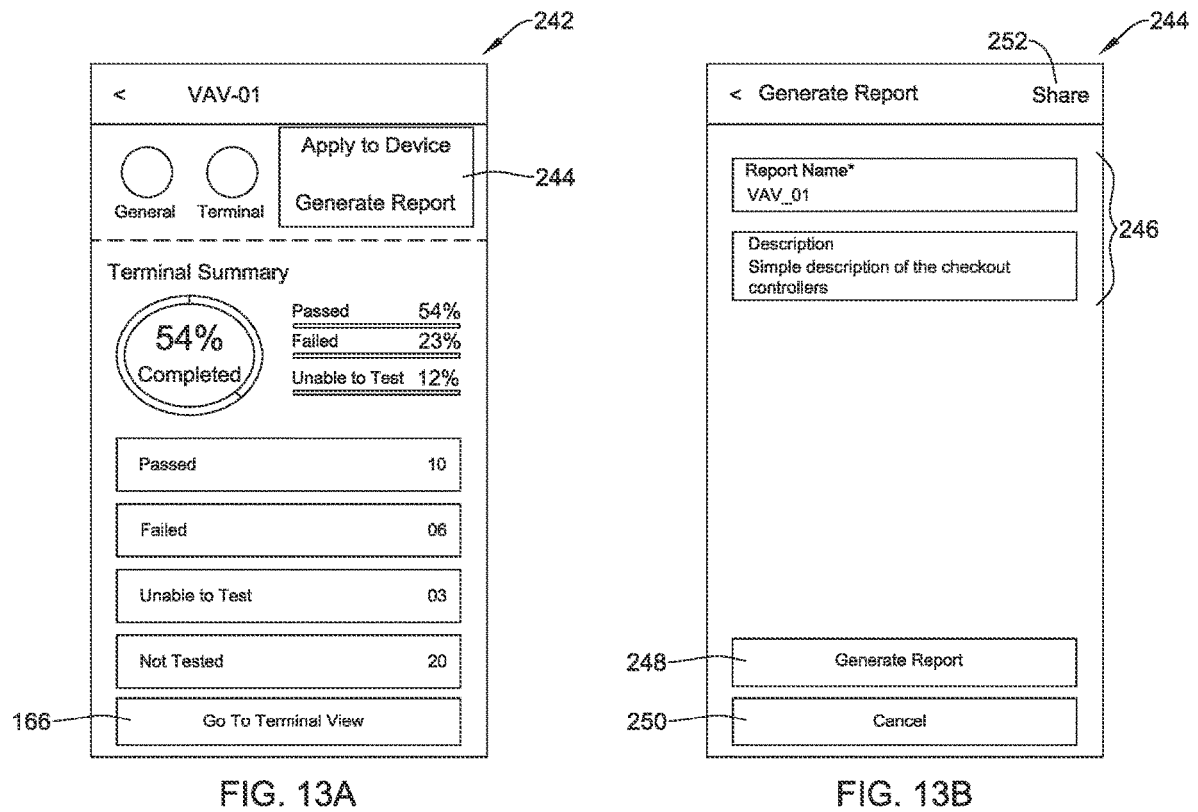
FIGS. 13A through 13C are screen shots from an illustrative application executing on a mobile device.
Figure 13C:
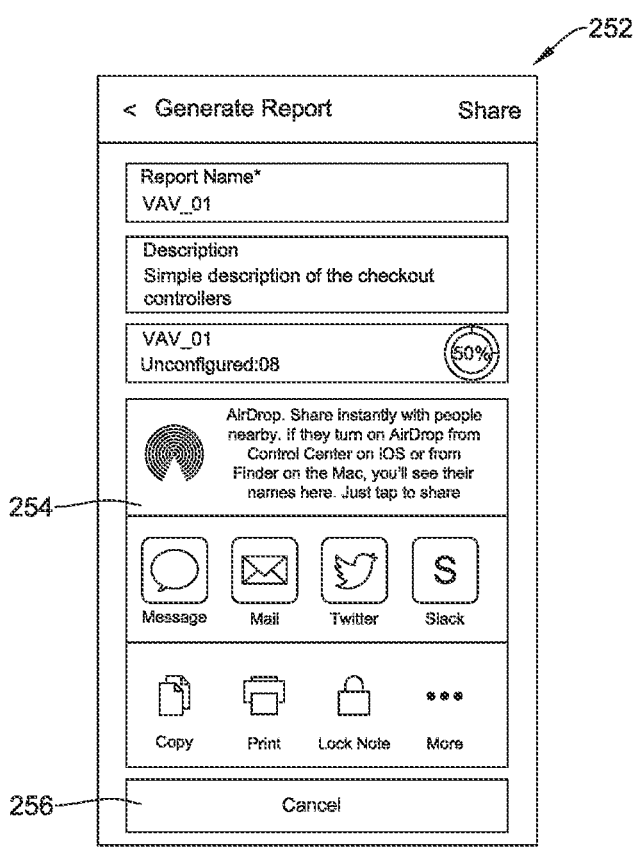

FIGS. 13A through 13C are screen shots from an illustrative application executing on a mobile device (such as the mobile device 22). FIG. 13A shows a screen 242 that is similar to the screen 154 (FIG. 9A), but the screen 242 includes a pop-up menu 244 that includes an option to generate a report. FIG. 13B shows a screen 244 that includes a section 246 identifying the report. A GENERATE REPORT button 248 may be selected to proceed with generating the report, a CANCEL button 250 may be used to cancel the report, and a SHARE button 252 may be used to share the report. FIG. 13C shows a screen 252 including an overlaid menu 254 that provides options for how to share or download the report. The screen 252 includes a CANCEL button 256 that may be used to cancel the report.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A method comprising:
performing a checkout of a Building Management System (BMS) installation that includes one or more installed BMS controllers, including performing the checkout in the absence of operational software having been downloaded onto any of the one or more installed BMS controllers, the operational software comprising control logic that defines a particular logical relationship between the input signals to be received by the one or more installed BMS controllers and the output signals provided by the one or more installed BMS controllers during operation of the BMS installation, wherein performing the checkout of the BMS installation comprises:
downloading a device configuration for each of the one or more BMS controllers to a mobile device from a remote device, the device configuration associating points of the BMS installation with particular I/O terminals of the one or more BMS controllers;
receiving a selection of one of the one or more BMS controllers via a user interface of the mobile device;
establishing communication between the mobile device and the selected one of the BMS controllers;
downloading the device configuration for the selected one of the BMS controllers from the mobile device to the selected one of the BMS controllers, and storing an association of one or more points of the BMS installation with particular I/O terminals of the selected one of the BMS controllers;

displaying on the user interface of the mobile device one or more points of the BMS installation that are associated with the selected one of the BMS controllers along with the associated one or more I/O terminals of the selected one of the BMS controllers;
displaying on the user interface of the mobile device a test icon for each of one or more of the points that are associated with the selected one of the BMS controllers;
in response to receiving a selection of one of the test icons via the user interface of the mobile device, the mobile device instructing the selected one of the BMS controllers to perform a corresponding test of the associated point, and in response, the selected one of the BMS controllers performing the corresponding test; and
the mobile device recording a test result of the corresponding test;
wherein at a point in time after the checkout has been completed the method further comprising downloading to each of the one or more installed BMS controllers the operational software comprising the control logic that defines the particular logical relationship between the input signals to be received by the one or more installed BMS controllers and the output signals provided by the one or more installed BMS controllers for use during operation of the BMS installation.

2. The method of claim 1, wherein after the mobile device records the test result of the corresponding test, downloading the control logic for controlling one or more of the BMS controllers after the control logic becomes available.

3. The method of claim 1, wherein performing the corresponding test by the selected one of the BMS controllers includes changing a state of one or more of the associated I/O terminals of the selected one of the BMS controllers.

4. The method of claim 1, wherein the selected one of the BMS controllers communicates the test result to the mobile device.

5. The method of claim 1, wherein the test result is entered via the user interface of the mobile device.

6. The method of claim 1, comprising:
communicating a value of each of one or more of the points that are associated with the selected one of the BMS controllers from the selected one of the BMS controllers to the mobile device; and
displaying the value of one or more of the points that are associated with the selected one of the BMS controllers on the user interface of the mobile device.

7. The method of claim 6, wherein the value is repeatedly updated, communicated and displayed at a rate of more than once per minute.

8. The method of claim 1, comprising displaying a fault associated with one or more of the points that are associated with the selected one of the BMS controllers on the user interface of the mobile device.

9. The method of claim 8, wherein the fault is determined based on the test result of the corresponding test of the associated point.

10. The method of claim 1, wherein establishing communication between the mobile device and the selected one of the BMS controllers comprises establishing wireless communication.

11. The method of claim 1, comprising the mobile device uploading the test result of the corresponding test to the remote device.

12. The method of claim 1, comprising:

displaying a listing of a plurality of BMS controllers of the BMS installation on the user interface of the mobile device; and allowing selection of one of the plurality of BMS controllers from the listing of the plurality of BMS controllers via the user interface of the mobile device.

13. The method of claim 1, comprising:

receiving an input via the user interface of the mobile device that changes the device configuration for the selected one of the BMS controllers, resulting in a changed device configuration; and uploading the changed device configuration from the mobile device to the remote device.

14. The method of claim 1, wherein the corresponding test includes the selected one of the BMS controllers reading a sensor value from a sensor connected to one or more of the I/O terminals of the selected one of the BMS controllers, wherein the test result includes the sensor value.

15. The method of claim 14, comprising:

receiving a user measured sensor value via the user interface of the mobile device; the mobile device comparing the sensor value of the test result with the user measured sensor value and automatically calculating an offset for the sensor value of the selected one of the BMS controllers;

communicating the offset for the sensor value from the mobile device to the selected one of the BMS controllers; and the selected one of the BMS controllers applying the offset to the sensor value during subsequent operation of the selected one of the BMS controllers.

16. The method of claim 1, comprising:

receiving a command to change a state of a selected I/O terminal of the selected one of the BMS controllers via the user interface of the mobile device; and in response, the mobile device instructing the selected one of the BMS controllers to change the state of the selected I/O terminal, and in response, the selected one of the BMS controllers changing the state of the selected I/O terminal.

17. The method of claim 1, wherein the one or more values comprise signal values at the terminals on the BMS controller, the signal values comprising signal values provided by the one or more BMS devices wired to the corresponding terminals on the BMS controller.

18. A method comprising:

performing a checkout of a Building Management System (BMS) installation that includes one or more installed BMS controllers, including performing the checkout in the absence of operational software having been downloaded onto any of the one or more installed BMS controllers, the operational software comprising control logic that defines a particular logical relationship between the input signals to be received by the one or more installed BMS controllers and the output signals provided by the one or more installed BMS controllers during operation of the BMS installation, wherein performing the checkout of the BMS installation comprises:

downloading a device configuration for each of the one or more BMS controllers to a mobile device from a remote device, the device configuration associating points of the BMS installation with particular I/O terminals of the one or more BMS controllers;

receiving a selection of one of the one or more BMS controllers via a user interface of the mobile device;

establishing communication between the mobile device and the selected one of the BMS controllers;

downloading the device configuration for the selected one of the BMS controllers from the mobile device to the selected one of the BMS controllers, and storing an association of one or more points of the BMS installation with particular I/O terminals of the selected one of the BMS controllers;

displaying on the user interface of the mobile device one or more points of the BMS installation that are associated with the selected one of the BMS controllers along with the associated one or more I/O terminals of the selected one of the BMS controllers;

receiving a command to change a state of a selected I/O terminal of the selected one of the BMS controllers via the user interface of the mobile device; and in response, the mobile device instructing the selected one of the BMS controllers to change the state of the selected I/O terminal, and in response, the selected one of the BMS controllers changing the state of the selected I/O terminal;

wherein at a point in time after the checkout has been completed the method further comprising downloading to each of the one or more installed BMS controllers the operational software comprising the control logic that defines the particular logical relationship between the input signals to be received by the one or more installed BMS controllers and the output signals provided by the one or more installed BMS controllers for use during operation of the BMS installation.

19. The method of claim 18, wherein after the selected one of the BMS controllers changing the state of the selected I/O terminal, downloading the control logic for controlling one or more of the BMS controllers after the control logic becomes available.

20. A method comprising:

connecting Building Management System (BMS) devices to a BMS controller, the BMS controller configured to subsequently utilize both a point list and a subsequently downloaded control logic in receiving signals from BMS devices and sending command signals to BMS devices, a mobile device configured to execute an application including a point list for the BMS controller, the method comprising:

wiring one or more BMS devices to corresponding terminals on the BMS controller prior to the control logic having been downloaded to the BMS controller;

wirelessly coupling the BMS controller with the mobile device;

the mobile device downloading, as part of a wiring checkout procedure, the point list of the application to the BMS controller without downloading the control logic to the BMS controller, wherein the control logic defines a particular logical relationship between the input signals to be received by the BMS controllers and the output signals to be provided by the BMS controllers during operation of the BMS controller;

the mobile device interrogating the BMS controller to obtain one or more values in the absence of the control logic having been loaded onto the BMS controller; and the mobile device displaying the obtained one or more values on a display of the mobile device;

wherein at a point in time after the wiring checkout procedure has been completed the method further comprising downloading the control logic to the BMS controller.

* * * * *